March 27, 1962 E. A. GALLO 3,026,851
SERVO MECHANISM
Filed Dec. 19, 1960
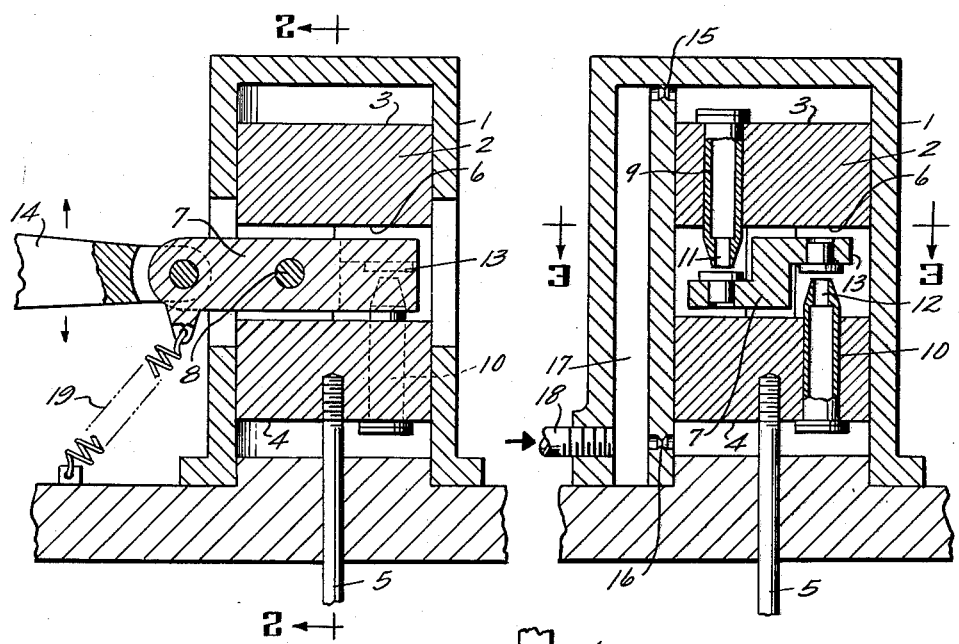
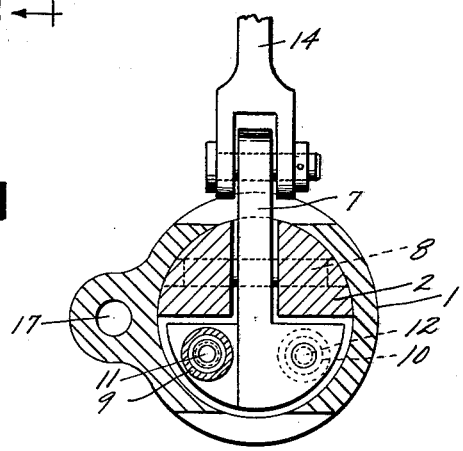
INVENTOR.
ELIA A. GALLO
BY
Carl Baker
ATTORNEY—

3,026,851
SERVO MECHANISM
Elia A. Gallo, Littleton, Colo., assignor to General Electric Company, a corporation of New York
Filed Dec. 19, 1960, Ser. No. 76,675
2 Claims. (Cl. 121—41)

This invention relates generally to actuating apparatus and more particularly to an improved fluid operated servo mechanism.

Servo mechanisms are frequently utilized when a device to be actuated in accordance with a control input signal requires more power for its actuation than can conveniently be derived from the input signal itself. In a servo, the needed power is obtained from an electrical, hydraulic or like power source and the input signal is used only to regulate or control the application of this supplementary power to the load device. Particularly when intended for use in aircraft applications, servo apparatus of this type is desirably made as compact in size and light in weight as possible consistent with its load requirements, and at the same time must afford good reliability and preferably be fail safe in operation.

The present invention has as a primary objective the provision of servo apparatus satisfying these desiderata and also affording the further advantage of mechanical simplicity with consequent economy of manufacture and maintenance.

Briefly stated, the invention in one preferred embodiment comprises a cylinder intermediate the ends of which a piston translates in response to fluid pressure differential across the piston. The pressure on each face of the piston is determined by the relative sizes of a fixed flow restricting orifice interposed in a fluid conduit connecting the cylinder space adjacent each piston face to a servo fluid pressure source, and a variable area or valve orifice the open area of which is controlled by a servo input element extending through the cylinder and free for movement within the piston. This input element is arranged to co-act with the variable area orifices to control the fluid pressures on opposite sides of the piston in reverse relationship, so that movement of the input element in one direction tends to increase the open area of one variable orifice and decrease that of the other, thus establishing a fluid pressure differential across the piston effective to cause it to precisely follow the movement of the input element and position the load accordingly.

The invention will be further understood and its various objects, features and advantages more fully appreciated by reference to the following detailed description when read in conjunction with the accompanying drawing, in which:

FIGURE 1 is a cross-sectional view of servo mechanism according to the invention;

FIGURE 2 is a section on the line 2—2 in FIGURE 1; and

FIGURE 3 is a section on the line 3—3 in FIGURE 2.

With continued reference to the drawings, wherein like reference numerals have been used throughout to designate like elements, a cylinder member 1 is provided in which is slidable a piston 2. The piston 2 provides a first pressure face 3 on one end and a second pressure face 4 on the other end. A piston rod 5 is also provided so that the motion of the piston 2 may be transmitted to a controlled member constituting the load (not shown).

A valve chamber 6 is formed within the piston 2, and a valve flapper element 7 extends into this chamber through an aperture in the cylinder side wall. The mounting of this flapper element 7 is a pin 8 carried by the piston, about which the flapper element pivots. Extending from the first face 3 of the piston 2 through the piston to the valve chamber 6 is a passage 9, and a similar passage 10 extends from the second piston face 4 to the valve chamber 6. These passages 9 and 10 are fitted with suitable valve heads 11 and 12, respectively, as shown.

The flapper element 7 is so constructed as to have one end 13 disposed adjacent the respective valve heads 11 and 12, to define therewith two pilot valves the open areas of which vary oppositely upon movement of the flapper element. The opposite end of the flapper element 7 extends outside of the valve chamber 6 and is pivotally connected externally thereof to a control input lever member 14 which together with flapper element 7 constitutes the servo control input means. Any play in the connection between member 7 and 14 may be taken up by a loading spring 19 connected as shown.

It is evident that movement of the control input member 14 will cause the end 13 of flapper element 7 to restrict the open area of one of the two valve orifices 11 or 12 and to enlarge the open area of the other. Also included in the cylinder structure 1 are fixed flow restricting orifices 15 and 16 adjacent to the piston faces 3 and 4, respectively. Connected to these flow restricting orifices 15 and 16 is a conduit 17 which connects through a line 18 to a servo fluid pressure source (not shown).

As is evident from FIGURE 1, the fluid which normally passes through the valve orifices 11 and 12 will exhaust about the apparatus. If the servo fluid used is air it may exhaust to the atmosphere with no additional structure being required. If a liquid is utilized as the servo fluid, it then may be preferable to enclose the servo mechanism within suitable container structure as will be obvious to those skilled in the art.

In operation, an input signal is transmitted to the servo mechanism in the form of an upward or downward displacement of the input member 14 and consequent rotation of flapper element 7 about its pivot 8. Assuming that the displacement of input member 14 is a downward one, the resultant rotation of the flapper element is counterclockwise and its effect is to reduce the open area of pilot valve 11 and to enlarge the open area of pilot valve 12. The open area of pilot valve 11 thus will be decreased relative to the open area of fixed orifice 15, and the open area of pilot valve 12 will be increased relative to the open area of fixed orifice 16, and as a result the fluid pressure above the servo piston will rise whereas pressure below the piston will fall.

The pressure differential thus created across the piston will cause its downward movement, effecting rotation of the flapper element 7 in clockwise direction so as to restore it to its original position with respect to the pilot valve elements 11 and 12. In this fashion, the servo piston 2 is constrained to follow the movement of input member 14, and when it reaches the position called for by position of the input member 14, flapper element 7 then is again centered between the two pilot valve elements 11 and 12 thus re-establishing equilibrium of pressures on opposite sides of the servo piston 2 to halt its further movement.

Should the input member 14 be moved upwardly, this would cause clockwise rotation of flapper element 7 causing a decrease in open area of pilot valve 12 and an increase in open area of pilot valve 11. The resultant pressure increase below servo piston 2 and pressure decrease above the piston will cause its movement upwardly to a position such as to re-center the flapper element 7 between the pilot valves 11 and 12 to thus restore equilibrium of the system.

It will be noted that the pivotal connections provided between flapper element 7 and the input member 14, and also between the flapper element and the servo piston 2, allow the valving surfaces of flapper element 7 to remain substantially flat to the cooperating faces of pilot valve elements 11 and 12 at all positions of the servo piston 2 throughout its range of travel within the cylinder 1. This arrangement also is of advantage in that it prevents the servo unit from loading the input member 14, since relative movement between the servo piston and input member 14 is permitted by change in position of flapper element 7 with respect to the piston 2. Since independent movement of servo piston 2 without corresponding movement of or loading upon the input member 14 is thus permitted, the servo may engage in any slight hunting action or other corrective movement necessary to maintain equilibrium of fluid pressures within the servo system, without these movements being reflected back to the input member 14. This is an advantage of particular importance when, as is frequently the case, the control input member operates to control several different servos none of which should react back through the input member to influence operation of the others. Still another advantage of this arrangement is that by proper selection of lever arm ratios of flapper element 7, as determined by location of pivot pin 8 along the length of the flapper element, the operating characteristics of the unit may be controlled to obtain stability with desired sensitivity.

One malfunction possible in all pilot valve controlled fluid power mechanisms is clogging of the fluid passages within the mechanism by dirt or other contaminants entrained within the servo operating fluid. In the servo mechanism of this invention, such clogging will not deprive the operator of control through the servo, irrespective of whether clogging occurs at one of the fixed flow restricting orifices 15 or 16 or at one of the pilot valve orifices 11 and 12, and irrespective of whether clogging of the orifice is complete or only partial.

If, for example, either the fixed orifice 15 or the pilot valve orifice 12 were partially but not completely clogged by foreign matter, there would result an increase in fluid pressure below the servo piston 2 relative to pressure above the servo piston. The piston accordingly would move upwardly to close pilot valve 11 and open pilot valve 12, this action following from the fact that input member 14 under these conditions is stationary and upward movement of the piston accordingly acts to cause clockwise rotation of flapper element 7. As pilot valve 11 closes and pilot valve 12 opens, the pressures on opposite sides of piston 2 tend to again equalize and restore the system to equilibrium. The system thus is restored to equilibrium with the only change being a small shift in angular position of flapper element 7 at null, and the system accordingly will continue to provide control in the same manner as before except for a small inaccuracy due to the shift in null position of the flapper element and piston with respect to the control input member.

In the case of a complete block of fixed orifice 15 or pilot valve orifice 12, the resultant increase in fluid pressure below piston 2 would cause its upward movement to thus effect clockwise rotation of flapper element 7. The action just described results in complete closing of pilot valve 11.

Now if the input member 14 is moved in upward direction, flapper element 7 rotates in counterclockwise direction and, by increasing the open area of pilot valve 11 and decreasing that of pilot valve 12, causes either a decrease in pressure above the servo piston 2 or an increase in pressure below the piston, depending upon whether it is orifice 12 or 15 which is blocked. In either case, there is established across the piston a pressure differential operative to drive it upwardly to follow the movement of the input member 14.

If input member movement were in the downward direction, however, the normal clockwise movement of flapper element 7 is prevented by virtue of the fact that the flapper element already is in engagement with pilot valve element 11, so under these conditions the input member 14 must directly drive the servo piston 2 in downward direction without power assist from the servo.

Similarly, if the fixed orifice 16 or pilot valve element 11 were partially or completely clogged, the system would continue to operate normally unless the blockage were so complete that equilibrium could not be maintained, in which case the system still would continue to provide power boost in one direction though not in the other. In this fashion, the servo mechanism of the invention provides continuing control of position of the output member 5 even though the servo system may be partially or completely disabled by reason of clogging of one or more of the fluid orifices within the system.

From the foregoing it will be apparent that the servo mechanism of this invention provides fail-safe operation with optimum simplicity of mechanical structure and with the further advantages of small size and light weight. While only one embodiment of the invention has been shown and described, it will be obvious that changes or modifications may be made without departing from the invention. The appended claims accordingly are intended to cover all such changes and modifications as fall within the true spirit and scope of the invention.

What is claimed as new and desire to be secured by Letters Patent of the United States is:

1. Servo mechanism comprising a servo fluid pressure source, a cylinder member including an apertured side wall, first and second conduit means each including a fluid flow restriction therein and each connecting said servo fluid pressure source through the flow restriction into said cylinder adjacent an end thereof, a piston slidable within said cylinder responsive to differences of fluid pressure on opposite faces of the piston, said piston having a valve chamber formed interiorly thereof opposite said cylinder wall aperture and first and second passage means one opening at one end through each face of the piston and each terminating at its other end in an orifice opening into said valve chamber in opposed relation to the orifice opening of the other, and control signal input means extending through said cylinder wall aperture into said valve chamber and including a valve flapper element pivotally connected to said piston and having oppositely facing surfaces disposed in spaced overlying relationship with said orifices to define therewith a pair of pilot valves the effective open areas of which vary differentially with movement of said flapper element to thus vary differentially the fluid pressures on opposite faces of the piston so as to urge its movement in accordance with the control signal input.

2. Servo mechanism comprising a servo fluid pressure source, a cylinder member including an apertured side wall, first and second conduit means each including a fluid flow restriction therein and each connecting said servo fluid pressure source through the flow restriction into said cylinder adjacent an end thereof, a piston slidable within said cylinder responsive to differences of fluid pressure on opposite faces of the piston, said piston having a valve chamber formed interiorly thereof opposite said cylinder wall aperture and first and second passage means one opening at one end through each face of the piston and each terminating at its other end in an orifice opening into said valve chamber in opposed relation to the orifice opening of the other, and control signal input means including an input lever member and a valve flapper element pivotally connected at one end to said input lever member and extending through said cylinder wall aperture into said valve chamber, said flapper element being pivotally connected intermediate its ends to said piston and having its end opposite said one end disposed between and in spaced overlying relationship with said orifices to define therewith a pair of pilot valves the effective open areas of which vary differentially with movement of said input lever member and flapper element to thus vary differentially the fluid pressures on opposite faces of the piston so as to urge its movement to follow movement of said input lever member.

References Cited in the file of this patent

UNITED STATES PATENTS 2,565,929 Onde ---------------- Aug. 28, 1951
2,829,624 Parkes ---------------- Apr. 8, 1958
2,936,783 Moffatt ---------------- May 17, 1960

FOREIGN PATENTS 751,362 France ---------------- June 19, 1933